(12) United States Patent
Yokawa

(10) Patent No.: US 7,499,113 B2
(45) Date of Patent: Mar. 3, 2009

(54) ELECTRONICS DEVICE WITH VIDEO REPRODUCER HAVING A HOLDER FOR SUPPORTING A PRINTED CIRCUIT BOARD THEREIN

(75) Inventor: Akira Yokawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 392 days.

(21) Appl. No.: 11/267,924

(22) Filed: Nov. 4, 2005

(65) Prior Publication Data

US 2006/0103886 A1    May 18, 2006

(30) Foreign Application Priority Data

Nov. 4, 2004    (JP)    ............... 2004-006487 U

(51) Int. Cl.
  H04N 5/64    (2006.01)
  H04N 7/00    (2006.01)
(52) U.S. Cl. ............... 348/836; 348/839; 348/552
(58) Field of Classification Search ............... 348/552, 348/836, 839; 312/7.1, 7.2, 9.1, 223.2; 361/681–683, 361/724–730, 736, 748, 752, 807; 455/347–349; 720/652; 386/125; 463/46
See application file for complete search history.

(56) References Cited

U.S. PATENT DOCUMENTS

| | | | | |
|---|---|---|---|---|
| 4,672,732 | A * | 6/1987 | Ramspacher et al. | 29/429 |
| 5,455,743 | A * | 10/1995 | Miyajima | 361/781 |
| 5,583,582 | A * | 12/1996 | Higuchi et al. | 348/836 |
| 5,673,090 | A * | 9/1997 | Higuchi et al. | 348/836 |
| 5,900,920 | A * | 5/1999 | Lee et al. | 348/836 |
| 6,095,623 | A * | 8/2000 | Goto et al. | 312/7.2 |
| 6,229,779 | B1 * | 5/2001 | Berry et al. | 720/655 |
| 6,565,444 | B2 * | 5/2003 | Nagata et al. | 463/46 |
| 6,778,381 | B1 * | 8/2004 | Bolognia et al. | 361/681 |
| 7,149,080 | B2 * | 12/2006 | Jackson, Jr. | 361/683 |

(Continued)

FOREIGN PATENT DOCUMENTS

| | | |
|---|---|---|
| JP | 07-153251 | 6/1995 |
| JP | 08-056318 | 2/1996 |
| JP | 09-135089 | 5/1997 |
| JP | 09-136089 | 5/1997 |
| JP | 3040912 | 6/1997 |

OTHER PUBLICATIONS

Patent Abstracts of Japan, Publication No. 07-153251, dated Jun. 16, 1995 (2 pages).
Patent Abstracts of Japan, Publication No. 08-056318, dated Feb. 27, 1996 (2 pages).
Patent Abstracts of Japan, Publication No. 09-135089, dated May 20, 1997 (2 pages).

Primary Examiner—Victor R Kostak
(74) Attorney, Agent, or Firm—Osha • Liang LLP

(57) ABSTRACT

A television with a video reproducer includes a cabinet provided with a pair of first rail portions, a printed circuit board attached to the pair of first rail portions of the cabinet, an included mechanical part arranged on an upper side of the printed circuit board, and a holding member provided with a stay portion for supporting the included mechanical part for supporting the printed circuit board. The cabinet is provided with a pair of second rail portions for supporting the holding member, the holding member being integrally provided with a rail engaging portion engaged with the second rail portion of the cabinet. The first rail portion is integrally provided to the cabinet to be arranged at a position of a height greater than the second rail portion integrally provided to the cabinet, having a bottom face of the cabinet as a reference.

9 Claims, 16 Drawing Sheets

U.S. PATENT DOCUMENTS

| | | | |
|---|---|---|---|
| 2001/0030491 A1* | 10/2001 | Maruta | 312/7.2 |
| 2004/0152552 A1* | 8/2004 | Gerding | 463/46 |
| 2004/0160370 A1* | 8/2004 | Ghosh et al. | 343/702 |
| 2005/0012437 A1* | 1/2005 | Schulman | 312/223.3 |
| 2005/0047107 A1* | 3/2005 | Pan | 361/807 |
| 2006/0238724 A1* | 10/2006 | Trivedi | 353/119 |

\* cited by examiner

PRIOR ART

PRIOR ART

PRIOR ART

PRIOR ART

PRIOR ART

PRIOR ART

PRIOR ART

ELECTRONICS DEVICE WITH VIDEO REPRODUCER HAVING A HOLDER FOR SUPPORTING A PRINTED CIRCUIT BOARD THEREIN

BACKGROUND OF THE INVENTION

1. Field of the Invention

The present invention relates to a television and an electronics device with a video reproducer, particularly relates to a television and an electronics device with a video reproducer having a holder for supporting a printed circuit board.

2. Description of the Related Art

In a related art, in an electronic apparatus of a television with a video reproducer or the like, there have been proposed various structures of printed circuit boards (refer to, for example, Patent References 1 through 4).

Patent Reference 1, mentioned above, discloses a structure of attaching a circuit board in which in a structure of attaching a tray (holding member) for mounting a main circuit board (printed circuit board) on a bottom face of a front cabinet (cabinet) and detachably supporting the tray mounted with an active system circuit board at a position of a predetermined height of the front cabinet, heat generated from the active system circuit board can be radiated by arranging the tray at an upper portion of a mechanical deck (included mechanical part) in a floated state.

Further, Patent Reference 2, mentioned above, discloses a structure of a VCR unit in which the VCR unit is slidably supported by engaging a projected streak (projected portion) of the VCR (video cassette recorder) unit (included mechanical part) constituted by a VCR mechanism, a holding member including a chassis, a ceiling plate and a bottom plate with a rail portion or a boss portion provided at a cabinet and which can be mounted to various apparatus by utilizing a plurality of through holes provided at the chassis constituting the VCR unit.

Further, Patent Reference 3, mentioned above, discloses a structure of an electronics device in which a tray chassis is positioned by engaging guide portions of the tray chassis (holding member) for supporting a printed circuit board with guide rails (rail portions) provided at side faces of a front cabinet (cabinet) and a rear cabinet (cabinet), and the tray chassis is fixed at a bottom face of the cabinet by engaging a front contact portion and a rear contact portion of the tray chassis respectively with a contact portion provided at a bottom face of the front cabinet and a contact portion provided at a bottom face of the rear cabinet.

Further, Patent Reference 4, mentioned above, discloses a structure of fixing a printed circuit board by inserting the printed circuit board to a rail (rail portion) provided at a bottom face of a cabinet (cabinet) and engaging an engaging claw provided at a button block attached to the cabinet with a square hole provided at the printed circuit board.

Further, in a related art, there is known a DVD (digital versatile disk) integrated type television having a holder for supporting a printed circuit board. FIG. 11 is a perspective view showing a total constitution of a DVD integrated type television according to an example of a related art. FIG. 12 through FIG. 18 are views for explaining a detailed structure of the DVD integrated type television of the related art. A structure of the DVD integrated type television of the related art will be explained in reference to FIG. 11 through FIG. 18.

As shown by FIG. 11 through FIG. 14, a DVD integrated type television 100 of the related art is provided with a front cabinet 110 and a rear cabinet 120 (refer to FIG. 11) constituting an outer frame of the DVD integrated type television 100, a display screen 130 (refer to FIG. 14) fitted to the front cabinet 110, a printed circuit board 140 for controlling the television, a holder 150 made of a resin having a size (plane area) substantially the same as that of the printed circuit board 140 for supporting the printed circuit board 140, a DVD drive apparatus 160 for driving DVD (not illustrated), and a printed circuit board 170 for controlling the DVD drive apparatus 160.

Further, as shown by FIG. 12 and FIG. 14, the front cabinet 110 is provided with a display window 111 for fitting the above-described display screen 130, a DVD inserting port 112 for inserting DVD, a terminal inserting hole (refer to FIG. 12), inserting holes (refer to FIG. 12) for arranging a power source button and various buttons, and a groove portion 115 (refer to FIG. 12) for fixing the holder 150.

Further, as shown by FIG. 12, an upper face of the printed circuit board 140 for controlling the television is attached with a terminal inserting port 141 inserted into the terminal inserting hole 113 of the front cabinet 110 and used in connecting to other apparatus, and an antenna inserting port 142 for inserting an antenna line. Further, as shown by FIG. 12 and FIG. 16, the printed circuit board 140 is provided with stay inserting holes 143 and 144 for inserting stay portions 151 and 152 of the holder 150, mentioned later, at respective two portions. Further, the upper face of the printed circuit board 140 is attached with the printed circuit board 170 for controlling the DVD drive apparatus 160 to extend vertically in an upper direction.

Further, as shown by FIG. 12, FIG. 16 and FIG. 18, the holder 150 made of a resin is provided with the stay portions 151 and 152 respectively at two portions at portions in correspondence with the stay inserting holes 143 and 144 of the printed circuit board 140. The stay portions 151 and 152 are provided with a function of supporting the DVD drive apparatus 160. Further, the stay portions 151 and 152 of the holder 150 are respectively provided with screw holes 153. Further, the stay portions 151 of the holder 150 are provided with positioning portions 154 for positioning (stop pivoting) the DVD drive apparatus 160 mounted to the stay portions 151 and 152. Further, as shown by FIG. 13, FIG. 14 and FIG. 17, a bottom face of the holder 150 is provided with two leg portions 155 engaged with the groove portions 115 provided at the bottom face of the front cabinet 110. The leg portion 155 is projected from the bottom face of the front cabinet 110 to the lower side. Further, the stay portions 151 and 152 of the holder 150 are provided with a height for arranging the DVD drive apparatus 160 at a position in correspondence with the DVD inserting port 112 of the front cabinet 110 when the DVD drive apparatus 160 is mounted. Therefore, as shown by FIG. 17, the holder 150 is provided with a height L2 including those of the leg portion 155 and the stay portions 151 and 152.

Further, as shown by FIG. 12 and FIG. 16, the DVD drive apparatus 160 for driving inserted DVD (not illustrated) is provided with screw inserting holes 161 at positions in correspondence with screw holes 153 of the stay portions 151 and 152 of the holder 150.

Next, an explanation will be given of a method of integrating the printed circuit board 140, the holder 150 and the DVD drive apparatus 160. First, as shown by FIG. 16, the stay portions 151 and 152 of the holder 150 are respectively inserted into the stay inserting holes 143 and 144 provided at the printed circuit board 140 for controlling the television. Thereby, the printed circuit board 140 for controlling the television can be supported in a state of projecting the stay portions 151 and 152 of the holder 150 vertically in the upper direction from the upper face of the printed circuit board 140. Next, the DVD drive apparatus 160 is arranged at the stay portions 151 and 152 projected vertically in the upper direction from the upper face of the printed circuit board 140 for controlling the television. From such state, screws 180 are fastened to the screw holes 153 of the stay portions 151 and 152 by way of the screw inserting holes 161 of the DVD drive apparatus 160. Thereby, the DVD drive apparatus 160 is attached to the holder 150. As a result, as shown by FIG. 15, the printed circuit board 140 and the DVD drive apparatus 160 are finished to be integrated to the holder 150.

Next, an explanation will be given of a method of attaching the printed circuit-board 140, the holder 150, and the DVD drive apparatus 160 to the front cabinet 110 in reference to FIG. 12, FIG. 15 and FIG. 17. First, from the state of integrating the printed circuit board 140, the holder 150 and the DVD drive apparatus 160, as shown by FIG. 12, the leg portion 155 (refer to FIG. 17) of the holder 150 is moved in an arrow mark E direction of FIG. 12 to be fitted to groove portion 115 of the front cabinet 110. At this occasion, the leg portion 155 of the holder 150 is arranged to be exposed to an outer side from the bottom face of the front cabinet 110. In this way, the printed circuit board 140, the holder 150, and the DVD drive apparatus 160 are finished to be attached to the front cabinet 110.

[Patent Reference 1] Japanese Utility Model No.3040912
[Patent Reference 2] JP-A-7-153251
[Patent Reference 3] JP-A-8-56318
[Patent Reference 4] JP-A-9-135089

SUMMARY OF THE INVENTION

According to the DVD integrated type television 100 of the related art shown in FIG. 11 through FIG. 18, the holder 150 is attached by fitting the leg portion 155 of the holder 150 to the groove portion 115 of the bottom face of the front cabinet 110. The DVD drive apparatus 160 is supported by the holder 150 attached to the front cabinet 110 and therefore, in order to drive DVD (not illustrated) inserted from the DVD inserting port 112 of the front cabinet 110, it is necessary to arrange the DVD drive apparatus 160 at a position in correspondence with the DVD inserting port 112. Therefore, the holder 150 supporting the DVD drive apparatus 160 needs a height from the bottom face of the front cabinet 110 to the DVD inserting port 112 of the front cabinet 110 and therefore, there is brought about a drawback that the height L2 (refer to FIG. 17) of the holder 150 is increased. Thereby, as shown by FIG. 17, in a state of integrating the printed circuit board 140 and the DVD drive apparatus 160 to the holder 150 to unitize, the height is increased owing to the large height of the holder 150. As a result, as shown by FIG. 19 and FIG. 20, in a state of integrating the printed circuit board 140 and the DVD drive apparatus 160 to the holder 150 as a holding member to unitize, when a plurality of stages of unitized sets are contained in a packing box 190 to carry, a containable number of pieces thereof is reduced and therefore, there poses a problem that a carrying efficiency is reduced and a carrying cost is increased. Further, according to the DVD integrated type television of the related art shown in FIG. 11 through FIG. 18, the printed circuit board 140 is supported only by the holder 150 and therefore, in order to firmly support the printed circuit board 140, it is necessary to constitute the holder 150 by a size equivalent to or larger than that of the printed circuit board 140. As a result, there poses a problem that it is difficult to achieve small-sized formation of the holder 150 as the holding member.

Further, according to the structure of attaching the circuit board disclosed in Patent Reference 1, the tray (holing member) for supporting the main circuit board (printed circuit board) is attached to the bottom face of the front cabinet and therefore, in order to support the main circuit board at a predetermined height, it is necessary to increase the height of the tray to a position of the predetermined height. As a result, the height of the tray is increased, when the tray (holding member), the main circuit board and the mechanical deck are integrated to unitize to be overlapped by a plurality of stages to be contained in a packing box to carry, a containable number of pieces thereof is reduced and therefore, similar to the structure shown in FIG. 11 through FIG. 18, there poses a problem that the carrying efficiency is reduced and the carrying cost is increased. Further, according to Patent Reference 1, the main circuit board is supported only by the tray attached to the bottom face and therefore, in order to firmly support the main circuit board, it is necessary to constitute the tray by a size equivalent to or larger than the main circuit board. Therefore, there poses a problem that it is difficult to achieve small-sized formation of the tray (holding member).

Further, according to the structure of the VCR unit disclosed in Patent Reference 2, the chassis, the ceiling plate, and the bottom plate are needed for supporting the VCR mechanism (included mechanical part) and therefore, there poses a problem that a number of parts of the holding member for supporting the included mechanical part is increased.

Further, according to the structure of the electronics device disclosed in Patent Reference 3, the tray chassis (holder) is fixed by pinching the tray chassis by the bottom faces of the front cabinet (cabinet) and the rear cabinet (cabinet) and therefore, in order to arrange the video deck arranged at the inner portion of the of the tray chassis to a position of a height in correspondence with a video cassette inserting hole of the front cabinet, it is necessary to increase the height of the tray chassis. As a result, in a state of integrating the printed circuit board and the video deck of the tray chassis as the holding member to unitize, when a plurality of stages of unitized sets are overlapped to contain in a packing box to carry, a containable number of pieces thereof is reduced and therefore, similar to the structure shown in FIG. 11 through FIG. 18, there poses a problem that the carrying efficiency is reduced and the carrying cost is increased. Further, according to Patent Reference 3, the printed circuit board is supported only by the tray chassis attached to the bottom face and therefore, in order to firmly support the printed circuit board, it is necessary to constitute the tray chassis by a size equivalent to or more than that of the of the printed circuit board. Therefore, there poses a problem that it is difficult to achieve small-sized formation of the tray chassis as the holding member.

Further, according to the structure of integrating the printed circuit board of the television receiver or the like disclosed in Patent Reference 4, when the television receiver is mounted with, for example, an included mechanical part of a video deck, a DVD drive apparatus or the like, in order to support the included mechanical part at a position of a predetermined height, a holder (holding member) for supporting the included mechanical part having a structure similar to that shown in FIG. 11 through FIG. 18 is needed. In this case, in order to support the included mechanical part at the position of the predetermined height, it is necessary to extend the holding member to the position of the predetermined height and therefore, similar to the case of the holder shown in FIG. 11 through FIG. 18, there is brought about a drawback that the height of the holder (holding member) is increased. As a result, when the printed circuit board and the included mechanical part are integrated to the holder (holding member) to unitize and a plurality of stages of unitized sets are overlapped to be contained in a packing box to carry, a containable number of pieces is reduced and therefore, similar to the structure shown in FIG. 11 through FIG. 18, there poses a problem that the carrying efficiency is reduced and the carrying cost is increased.

The invention has been carried out in order to resolve the above-described problem and it is an object of the invention to provide a television and an electronics device with a video reproducer capable of achieving an increase in a carrying efficiency and a reduction in a carrying cost in carrying a printed circuit board, a holding member and an included mechanical part in a state of being unitized to integrate, achieving small-sized formation of the holding member and restraining an increase in a number of parts of members for supporting the included mechanical part.

According to a first aspect of the invention, there is provided a television with a video reproducer including a cabinet provided with a pair of first rail portions, a printed circuit board attached to the first rail portion of the cabinet, an included mechanical part arranged on an upper side of the printed circuit board, and a single holding member provided with a stay portion for supporting the included mechanical part for supporting the printed circuit board, wherein the cabinet is provided with a pair of second rail portions for supporting the holding member, the holding member is integrally provided with a rail engaging portion engaged with the second rail portion of the cabinet, the first rail portion is integrally provided to the cabinet to be arranged at a position of a first height from a bottom face of the cabinet, and the second rail portion of the cabinet is integrally provided to the cabinet to be arranged at a position of a second height smaller than the first height from the bottom face of the cabinet, and the holding member is provided with a plane area smaller than a plane area of the printed circuit board, and a total thereof is arranged at an inner portion of the cabinet without being exposed to outside of the cabinet.

According to the television with a video reproducer according to the first aspect, as described above, by providing the rail engaging portion engaged with the second rail portion provided at the position of the predetermined height from the bottom face of the cabinet integrally with the holding member, a lower face of the holding member for supporting the included mechanical part can be attached at the position of the predetermined height from the bottom face of the cabinet. Thereby, when the included mechanical part is supported by the stay portion of the holding member at the predetermined position, in comparison with a case of attaching the lower face of the holding member to the bottom face of the cabinet, a height (length) from the lower face of the holding member to an upper end of the stay portion can be reduced. Thereby, when in a state of integrating the included mechanical part and the printed circuit board to the holding member to be unitized, a plurality of stages of unitized sets are overlapped to be contained in a packing box to carry, a number of pieces of containing the unitized sets to the packing box can be increased by an amount of reducing the height of the holding member. As a result, when the included mechanical part is integrated to the holding member to be unitized to carry, a carrying efficiency can be increased and a carrying cost can be reduced. Further, by providing the single holding member provided with the stay portion for supporting the included mechanical part, the included mechanical part can be supported only by the single holding member and therefore, a number of parts of members for supporting the included mechanical part can be prevented from being increased. Further, by providing the first rail portion of the cabinet and the holding member for supporting the printed circuit board, the printed circuit board can be supported by both of the first rail portion of the front cabinet and the holding member. Therefore, in comparison with a case of supporting the printed circuit board only by the holding member, even when the plane area of the holding member is formed to be smaller than the plane area of the printed circuit board, the printed circuit board can firmly be supported. As a result, small-sized formation of the holding member can be achieved. In this case, by providing the first rail portion for supporting the printed circuit board integrally with the cabinet, small-sized formation of the holding member can be achieved without increasing a number of parts. Further, by arranging the total of the holding member at the inner portion of the cabinet without being exposed to outside of the cabinet, the holding member can completely be sealed hermetically at the inner portion of the cabinet. Thereby, the holding member needs not to use an expensive special material which may be exposed to outside of the cabinet and therefore, a cost of fabricating the holding member can be reduced. Further, by forming the holding member to include the plane area smaller than the plane area of the printed circuit board, the plane area of the holding member can be reduced and therefore, easily, small-sized formation of the holding member can be achieved. Further, by providing the first rail portion of the cabinet integrally with the cabinet and providing the second rail portion of the cabinet integrally with the cabinet, even when the holding member for supporting the printed circuit board and the included mechanical part respectively by the first rail portion and the second rail portion and the second rail portion, the printed circuit board and the holding member can be supported without increasing a number of parts. Further, by making the second height of the second rail portion for supporting the holding member smaller than the first height of the first rail portion for supporting the printed circuit board, easily, by the holding member supported by the second rail portion, the lower face of the printed circuit board supported by the second rail portion can be supported.

According to a second aspect of the invention, there is provided an electronics device including a printed circuit board, an included mechanical part arranged on an upper side of the printed circuit board, a single holding member provided with a stay portion for supporting the included mechanical part for supporting the printed circuit board, and a cabinet integrally provided with a pair of first rail portions for supporting the printed circuit board, and a pair of second rail portions arranged at a position of a predetermined height from a bottom face thereof for supporting the single holding member, wherein the single holding member is integrally provided with a rail engaging portion engaged with the second rail portion of the cabinet.

According to the electronics device according to the second aspect, as described above, by providing the rail engaging portion engaged with the second rail portion provided at the position of the predetermined height from the bottom face of the cabinet integrally with the holding member, the lower face of the holding member for supporting the included mechanical part can be attached at the position of the predetermined height from the bottom face of the cabinet. Thereby, when the included mechanical part is supported by the stay portion of the holding member at the predetermined position, in comparison with a case of attaching the lower face of the holding member at the bottom face of the cabinet, a height (length) from the lower face of the holding member to an upper end of the stay portion can be reduced. Thereby, when in a state of integrating the included mechanical part and the printed circuit board to the holding member to be unitized, a plurality of stages of unitized sets are overlapped to be contained to carry, a number of pieces of containing the unitized sets to the containing box can be increased by an amount of reducing the height of the holding member. As a result, when the included mechanical part is integrated to the holding member to be unitized to carry, the carrying efficiency can be increased and the carrying cost can be reduced. Further, by providing the single holding member provided with the stay portion for supporting the included mechanical part, the included mechanical part can be supported only by the single holding member and therefore, a number of parts of members for supporting the included mechanical part can be prevented from being increased. Further, by providing the first rail portion of the cabinet and the holding member for supporting the printed circuit board, the printed circuit board can be supported by both of the first rail portion of the cabinet and the holding member. Therefore, in comparison with the case of supporting the printed circuit board only by the holding member, even when the plane area of the holding member is formed to be smaller than the plane area of the printed circuit board, the printed circuit board can firmly be supported. As a result, small-sized formation of the holding member can be achieved. In this case, by providing the first rail portion for supporting the printed circuit board integrally with the cabinet, small-sized formation of the holding member can be achieved without increasing a number of parts.

In the electronics device according to the second aspect of the invention, preferably, a total of the holding member is arranged at an inner portion of the cabinet without being exposed to outside of the cabinet. When constituted in this way, the holding member can completely be sealed hermitically at the inner portion of the cabinet. Thereby, the holding member needs not to use an expensive special material which may be exposed to outside of the cabinet and therefore, the cost of fabricating the holding member can be reduced.

In the electronics device according to the second aspect of the invention, preferably, the holding member is provided with a plane area smaller than a plane area of the printed circuit board. When constituted in this way, the plane area of the holding member can be reduced and therefore, easily, small-sized formation of the holding member can be achieved.

In the electronics apparatus according to the second aspect of the invention, preferably, the first rail portion of the cabinet is integrally provided to the cabinet to be arranged at a position of a first height from a bottom face of the cabinet, and the second rail portion of the cabinet is integrally provided to the cabinet to be arranged at a position of a second height smaller than the first height from the bottom face of the cabinet. When constituted in this way, even when the holding member for supporting the printed circuit board and the included mechanical part is supported respectively by the first rail portion and the second rail portion, the printed circuit board and the holding member can be supported without increasing a number of parts. Further, by making the second height of the second rail portion for supporting the holding member smaller than the first height of the first rail portion for supporting the printed circuit board, easily, by the holding member supported by the second rail portion, the lower face of the printed circuit board supported by the first rail portion can be supported.

DETAILED DESCRIPTION OF THE PREFERRED EMBODIMENTS

An embodiment embodying the invention will be explained in reference to the drawings as follows.

Figure 1:
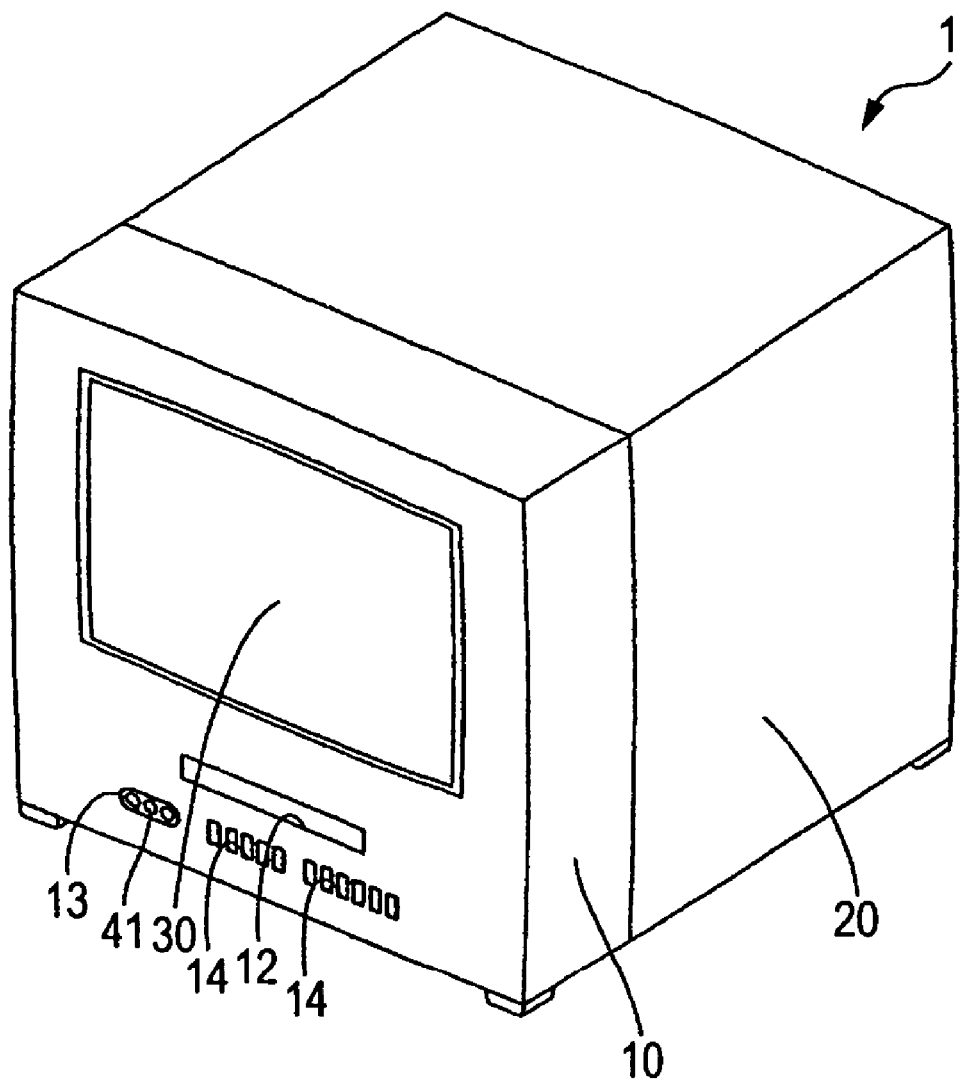
FIG. 1 is a perspective view showing a total constitution of a DVD integrated type television according to an embodiment of the invention.

FIG. 1 is a perspective view showing a total constitution of a DVD integrated type television according to the embodiment of the invention. FIG. 2 through FIG. 8 are views for explaining a detailed structure of the DVD integrated type television according to the embodiment of the invention. An explanation will be given of a structure of the DVD integrated type television according to the embodiment of the invention in reference to FIG. 1 through FIG. 8. Further, according to the embodiment, an explanation will be given of a case of applying a television and an electronics device with a video reproducer of the invention to the DVD integrated type television.

As shown by FIG. 1 through FIG. 4, a DVD integrated type television 1 according to the embodiment of the invention is provided with a front cabinet 10 and a rear cabinet 20 (refer to FIG. 1) constituting an outer frame of the DVD integrated type television 1, a display screen 30 (refer to FIG. 4) fitted to the front cabinet 10, a printed circuit board 40 (refer to FIG. 2) for controlling the television, a holder 50 (refer to FIG. 2) made of a resin for supporting the printed circuit board 40, a DVD drive apparatus 60 for driving DVD (not illustrated), and a printed circuit board 70 for controlling the DVD drive apparatus 60. Further, the front cabinet 10 and the rear cabinet 20 constitute an example of a 'cabinet' of the invention. Further, the holder 50 is an example of a 'holding member' of the invention, and the DVD drive apparatus 60 is an example of an 'included mechanical part' of the invention.

Figure 2:
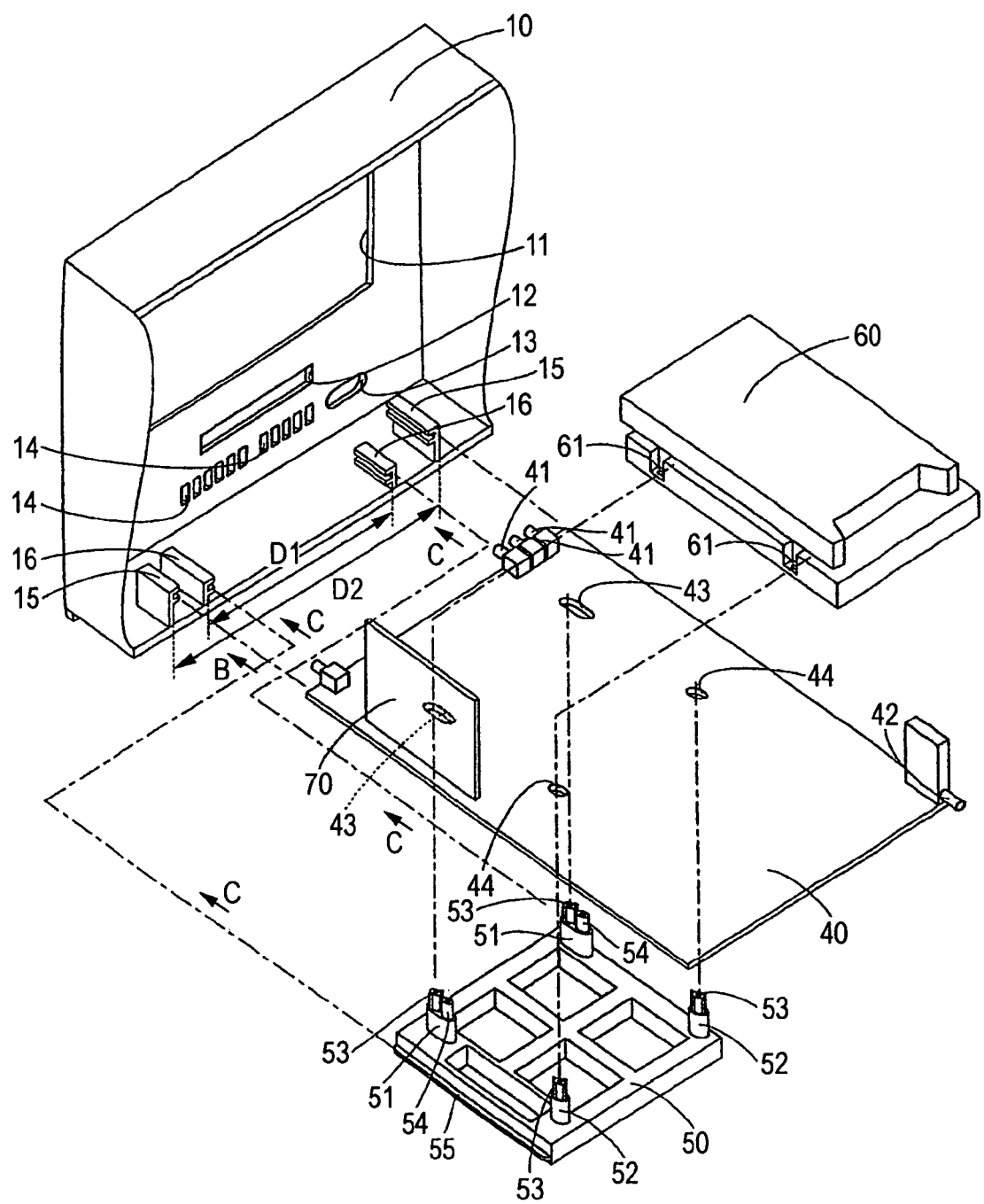
FIG. 2 is a disassembled perspective view of the DVD integrated type television according to the embodiment of the invention shown in FIG. 1.
Figure 4:
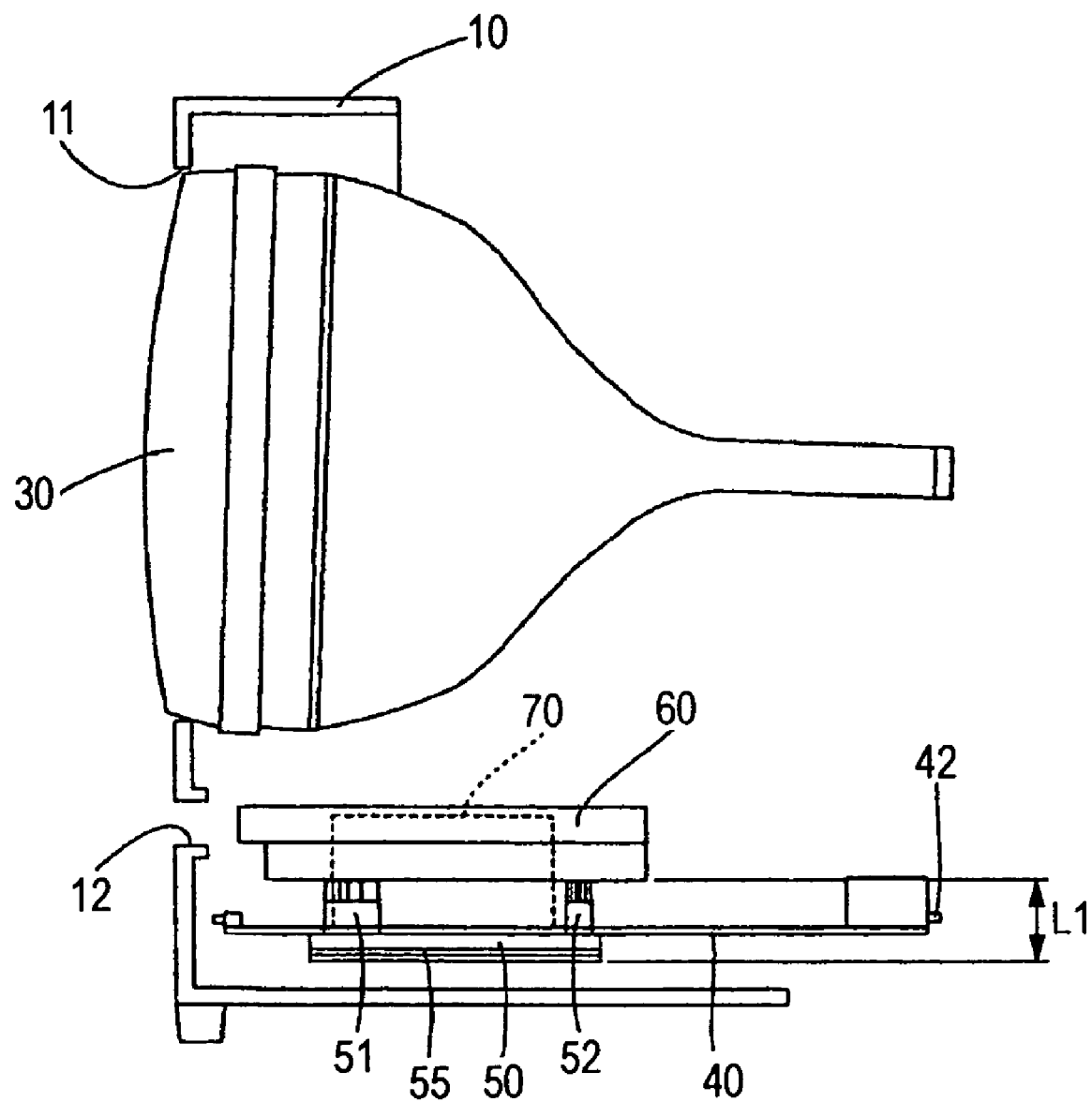
FIG. 4 is a side view of the DVD integrated type television according to the embodiment of the invention shown in FIG. 1.

Further, as shown by FIG. 2 and FIG. 4, the front cabinet 10 is provided with a display window 11 for fitting the display screen 30, a DVD inserting port 12 for inserting DVD, a terminal inserting hole 13 (refer to FIG. 2), and an inserting hole 14 (refer to FIG. 2) for arranging a power source button (not illustrated) and respective buttons (not illustrated).

Figure 3:
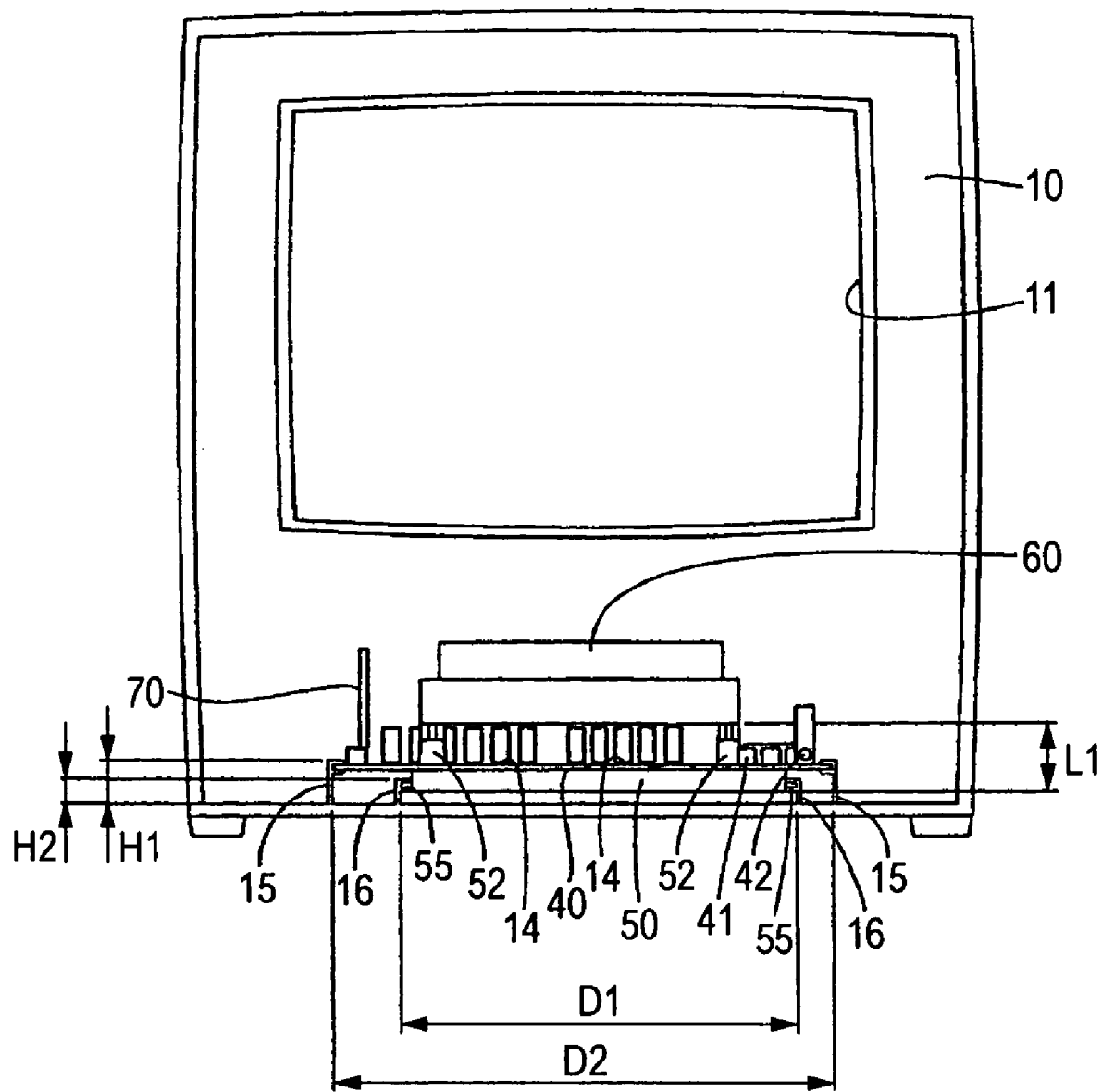
FIG. 3 is a front view of the DVD integrated type television according to the embodiment of the invention shown in FIG. 1.

Here, according to the embodiment, as shown by FIG. 2 and FIG. 3, a bottom face of the front cabinet 10 is integrally provided with a pair of first rail portions 15 for supporting the printed circuit board 40, and a pair of second rail portions 16 for supporting the holder 50. An interval D1 between the pair of second rail portions 16 supporting the holder 50 is set to be smaller than an interval D2 between the pair of first rail portions 15 for supporting the printed circuit board 40. Further, as shown by FIG. 3, the first rail portion 15 is arranged at a position of a first height H1 from the bottom face of the front cabinet 10. Further, the second rail portion 16 is arranged at a position of a second height H2 from the bottom face of the front cabinet 10. Further, the position of the second height H2 of the second rail portion 16 is set to be smaller than the position of the first height H1 of the first rail portion 15.

Figure 6:
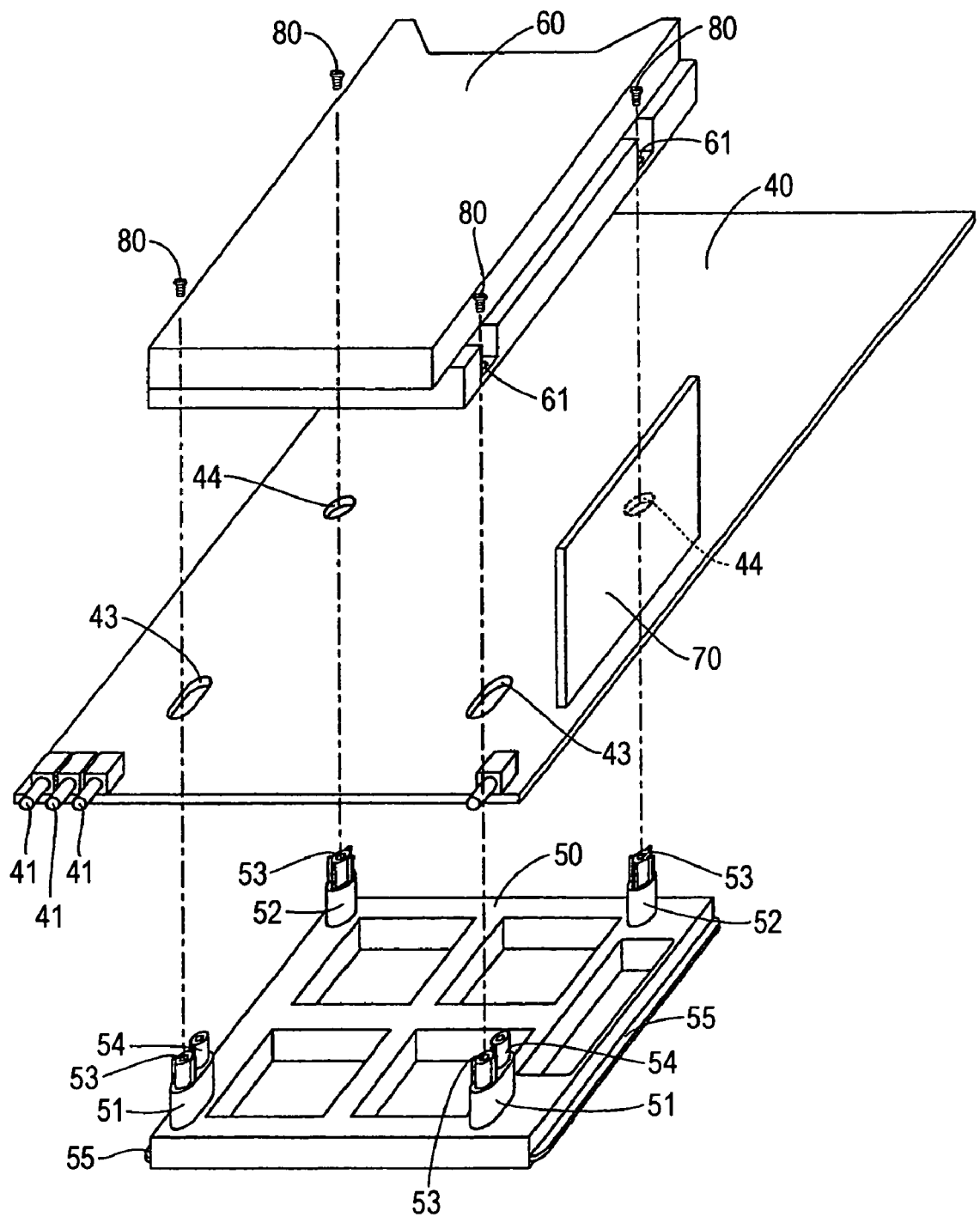
FIG. 6 is a disassembled perspective view of the printed circuit board, the holder and the DVD drive apparatus of the DVD integrated type television according to the embodiment of the invention shown in FIG. 1.

Further, as shown by FIG. 2, an upper face of the printed circuit board 40 for controlling the television is attached with a terminal inserting port 41 inserted into the terminal inserting hole 13 of the front cabinet 10 and used in connecting to other apparatus, and an antenna inserting port 42 for inserting an antenna line. Further, as shown by FIG. 2 and FIG. 6, the printed circuit board 40 is provided with stay inserting holes 43 and 44 for inserting stay portions 51 and 52 of the holder 50, mentioned later, respectively at two portions thereof. Further, an upper face of the printed circuit board 40 is attached with the printed circuit board 70 for controlling the DVD drive apparatus 60 to extend vertically in an upper direction.

Figure 8:
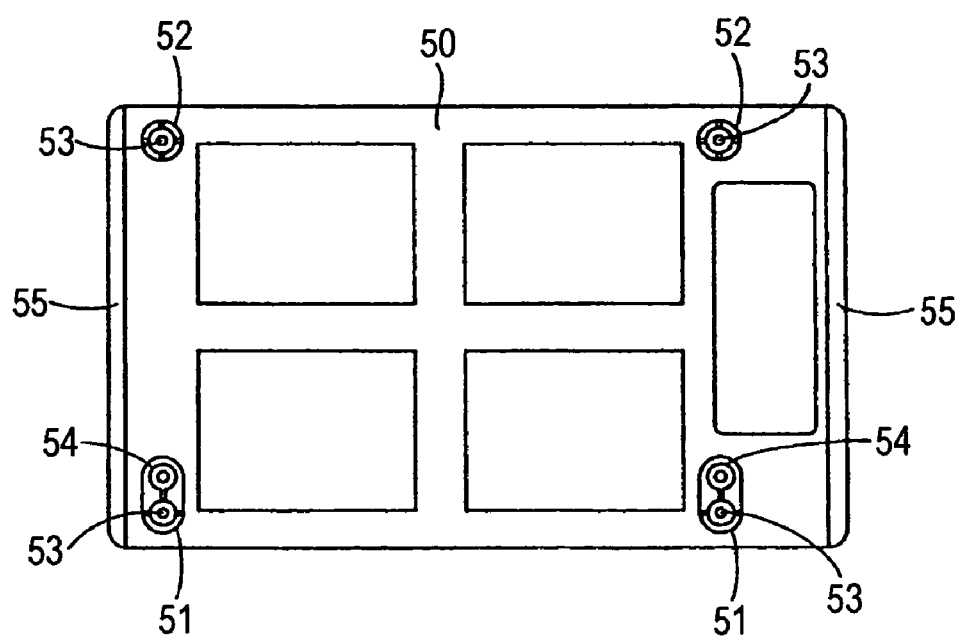
FIG. 8 is a plane view of the holder of the DVD integrated type television according to the embodiment of the invention shown in FIG. 1.

Further, as shown by FIG. 2, FIG. 6 and FIG. 8, the holder 50 made of a resin is provided with the stay portions 51 and 52 at the portions in correspondence with the stay inserting holes 43 and 44 of the printed circuit board 40 respectively at two portions thereof. The stay portions 51 and 52 are provided with a function of supporting the DVD drive apparatus 60. Further, the stay portions 51 and 52 of the holder 50 are respectively provided with screw holes 53. Further, the stay portions 51 of the holder 50 are provided with positioning portion 54 for positioning (stop pivoting) the DVD drive apparatus 60 mounted to the stay portions 51 and 52.

Figure 7:
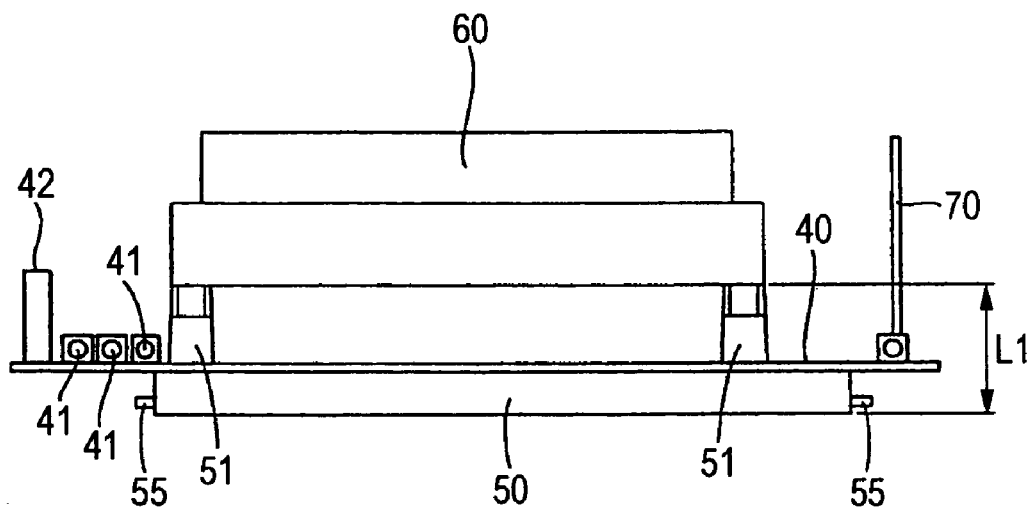
FIG. 7 is a front view of the printed circuit board, the holder and the DVD drive apparatus viewed from an arrow mark A direction shown in FIG. 5.
Figure 9:
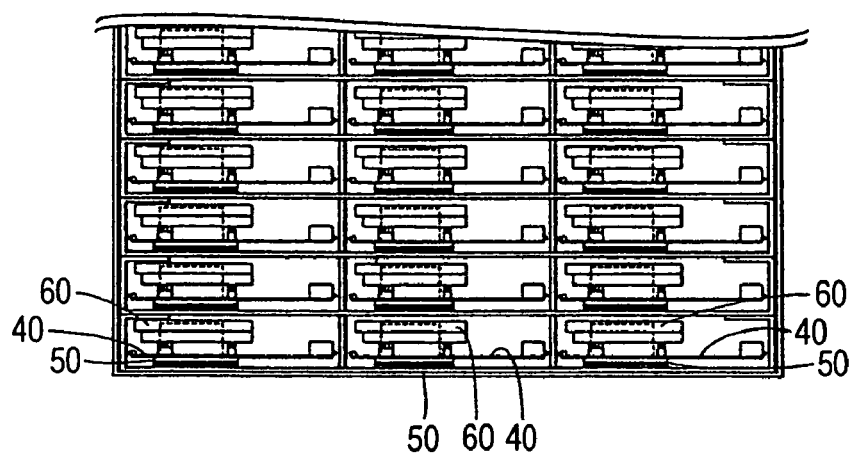
FIG. 9 is a front view showing a state of containing the printed circuit board, the holder and the DVD drive apparatus of the DVD integrated type television according to the embodiment of the invention shown in FIG. 1 in a packing box.
Figure 17:
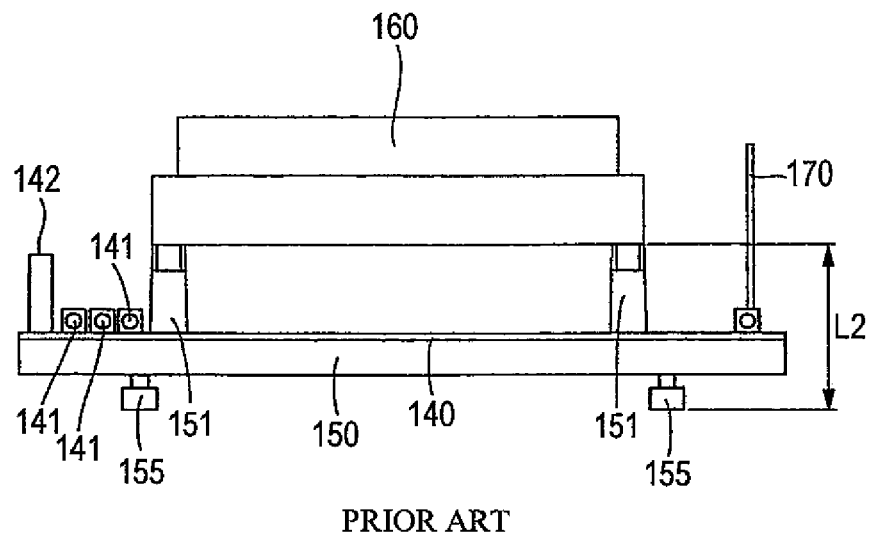
FIG. 17 is a front view of the printed circuit board, the holder and the DVD drive apparatus viewed from an arrow mark D direction shown in FIG. 15.
Figure 18:
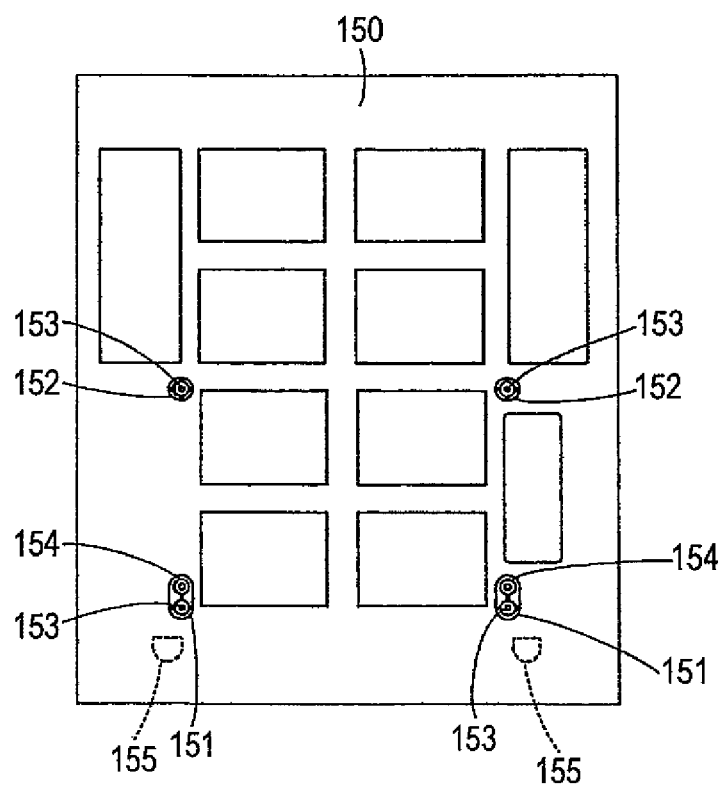
FIG. 18 is a plane view of the holder of the DVD integrated type television of the related art shown in FIG. 11.
Figure 19:
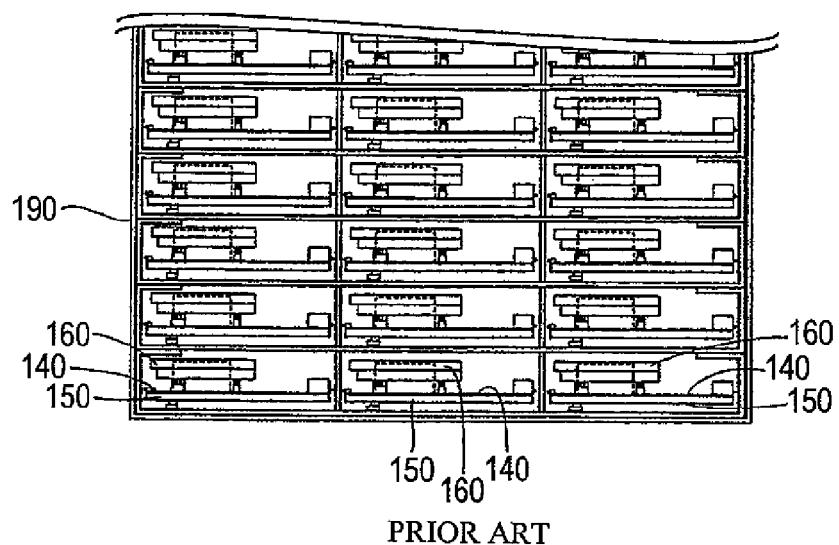
FIG. 19 is a front view showing a state of containing the printed circuit board, the holder and the DVD drive apparatus of DVD integrated type television of the related art shown in FIG. 11 in a packing box.
Figure 20:
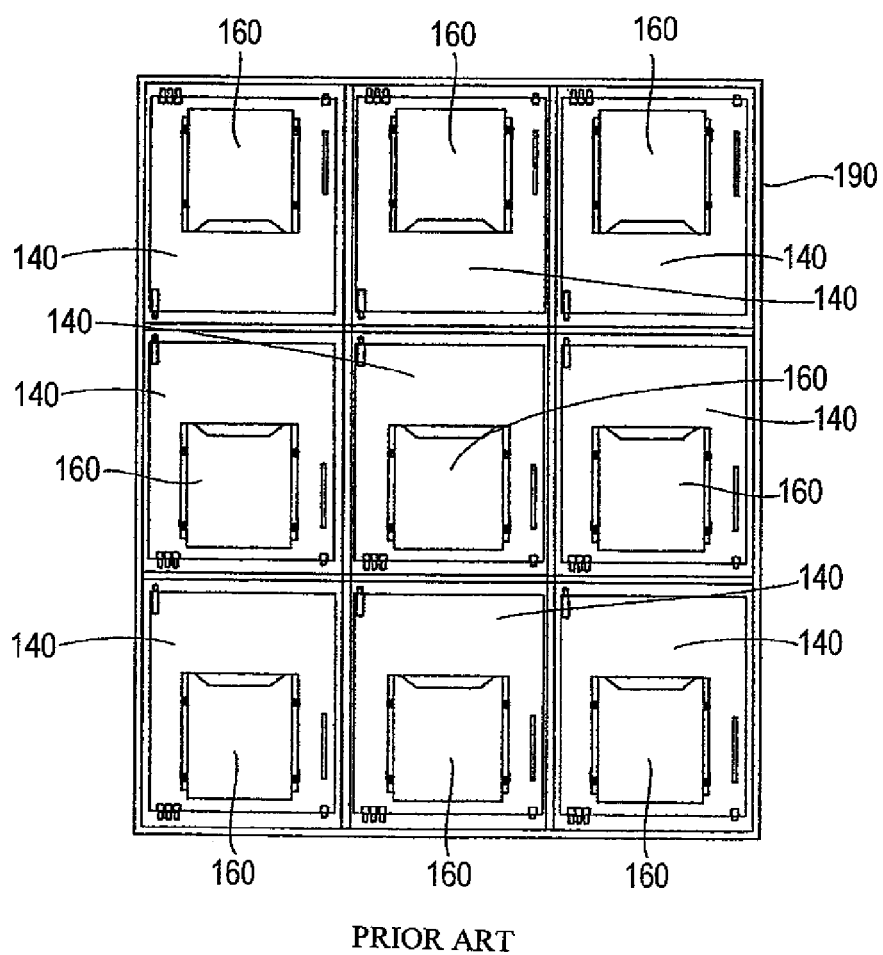
FIG. 20 is a plane view showing the state of containing the printed circuit board, the holder and the DVD drive apparatus of the DVD integrated type television of the related art shown in FIG. 11 in the packing box.

Further, according to the embodiment, the holder 50 is provided with a plane area smaller than a plane area of the printed circuit board 40 (plane area of about ⅓). Further, as shown by FIG. 9, the holder 50 is integrally provided with a rail engaging portion 55 for engaging with the second rail portion 16 (refer to FIG. 2 and FIG. 3) of the front cabinet 10. Further, the stay portions 51 and 52 of the holder 50 are provided with a height of being arranged at the positions in correspondence with the DVD inserting port 12 of the front cabinet 10. Therefore, as shown by FIG. 7, the holder 50 is provided with a height L1 including the stay portions 51 and 52. The height L1 of the holder 50 of the embodiment shown in FIG. 7 is smaller than the height L2 of the holder 150 of the related art shown in FIG. 17 by an amount of removing the leg portion 155 (FIG. 17).

Further, as shown by FIG. 2 and FIG. 6, the DVD drive apparatus 60 is provided with screw inserting holes 61 at the positions in correspondence with the screw holes 53 of the stay portions 51 and 52 of the holder 50.

Figure 5:
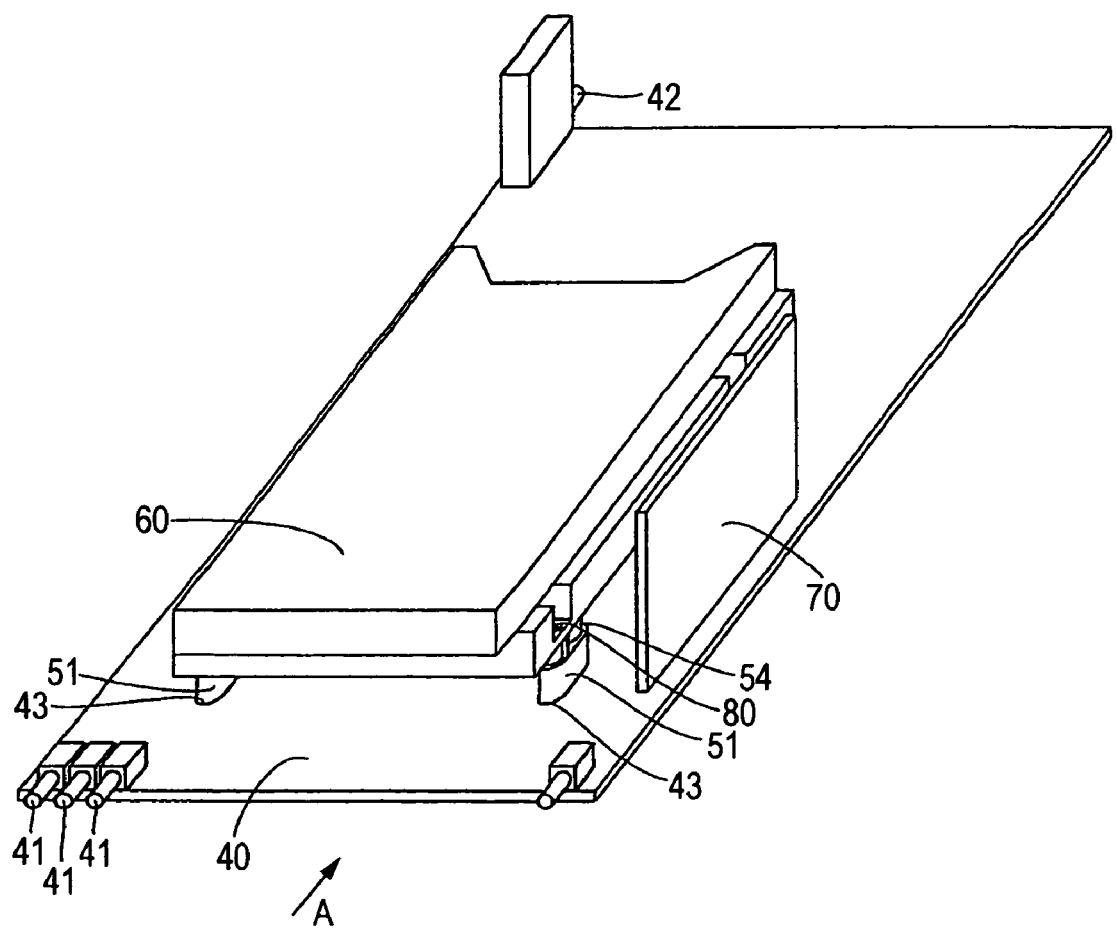
FIG. 5 is a perspective view of a printed circuit board, a holder and a DVD drive apparatus of the DVD integrated type television according to the embodiment of the invention shown in FIG. 1.

Next, an explanation will be given of a method of integrating the printed circuit board 40, the holder 50, and the DVD drive apparatus 60 in reference to FIG. 5 and FIG. 6. First, as shown by FIG. 6, the stay portions 51 and 52 of the holder 50 are respectively inserted into the stay inserting holes 43 and 44 provided at the printed circuit board 40 for controlling the television. Thereby, the stay portions 51 and 52 of the holder 50 can support the printed circuit board 40 for controlling the television in a state of being projected vertically in an upper direction from the upper face of the printed circuit board 40. Next, the DVD drive apparatus 60 is arranged to the stay portions 51 and 52 projected vertically in the upper direction from the upper face of the printed circuit board 40 for controlling the television. From the state, screws 80 are fastened to the screw holes 53 of the stay portions 51 and 52 by way of the screw inserting holes 61 of the DVD drive apparatus 60. Thereby, the DVD drive apparatus 60 is attached to the holder 50. As a result, the printed circuit board 40 and the DVD drive apparatus 60 are finished to be integrated to the holder 50.

Next, an explanation will be given of a method of attaching the printed circuit board 40, the holder 50, and the DVD drive apparatus 60 to the front cabinet 10 in reference to FIG. 2, FIG. 5 and FIG. 7. First, as shown by FIG. 5 and FIG. 7, from the state of integrating the printed circuit board 40, the holder 50 and the DVD drive apparatus 60, the printed circuit board 40 is moved in an arrow mark B direction (horizontal direction) of FIG. 2 and is fitted to the first rail portion 15 provided at the bottom face of the front cabinet 10. Further, similarly, the rail engaging portion 55 of the holder 50 is moved in an arrow mark C direction (horizontal direction) of FIG. 2 and fitted to the second rail portion 16 provided at the bottom face of the front cabinet 10. Further, by fitting the rear cabinet 20 from a rear side of the front cabinet 10, a total of the holder 50 is arranged at inner portions of the front cabinet 10 and the rear cabinet 20 without being exposed to outside of the front cabinet 10 and the rear cabinet 20. Thereby, the holder 50 can completely be sealed hermitically at the inner portions of the front cabinet 10 and the rear cabinet 20 and therefore, a cost of fabricating the holder 50 can be reduced since it is not necessary to use an expensive special material which may be exposed to outside of the front cabinet 10 and the rear cabinet 20. In this way, the printed circuit board 40, the holder 50, and the DVD drive apparatus 60 are finished to be attached to the front cabinet 10.

Figure 10:
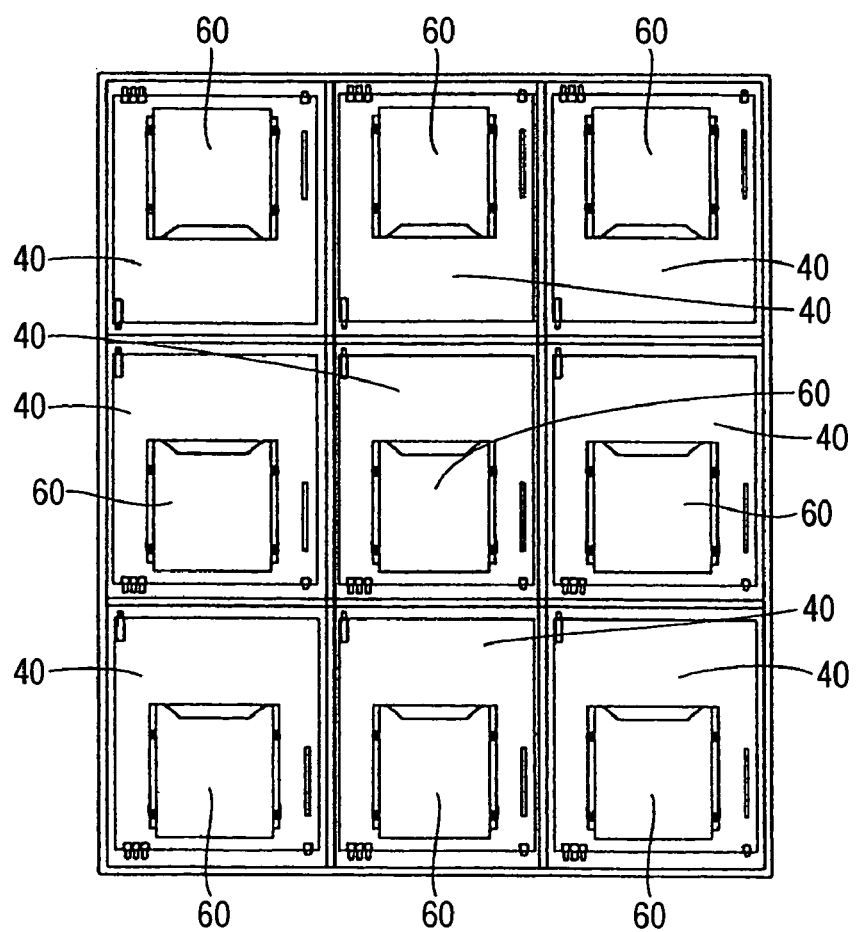
FIG. 10 is a plane view showing the state of packing the printed circuit board, the holder and the DVD drive apparatus of the DVD integrated type television according to the embodiment of the invention shown in FIG. 1 in the packing box.
Figure 11:
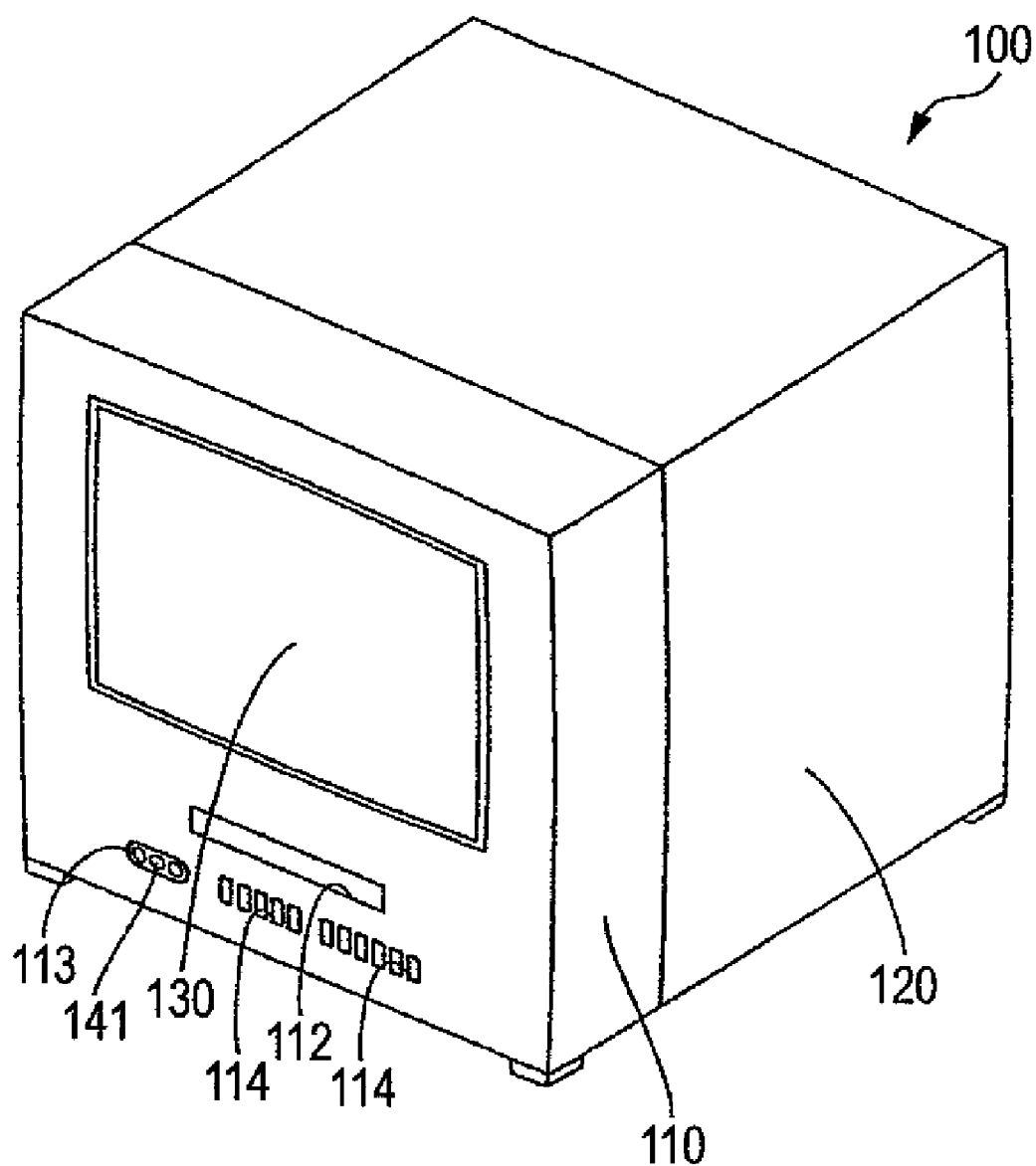
FIG. 11 is a perspective view showing a total constitution of a DVD integrated type television according to an example of a related art.
Figure 12:
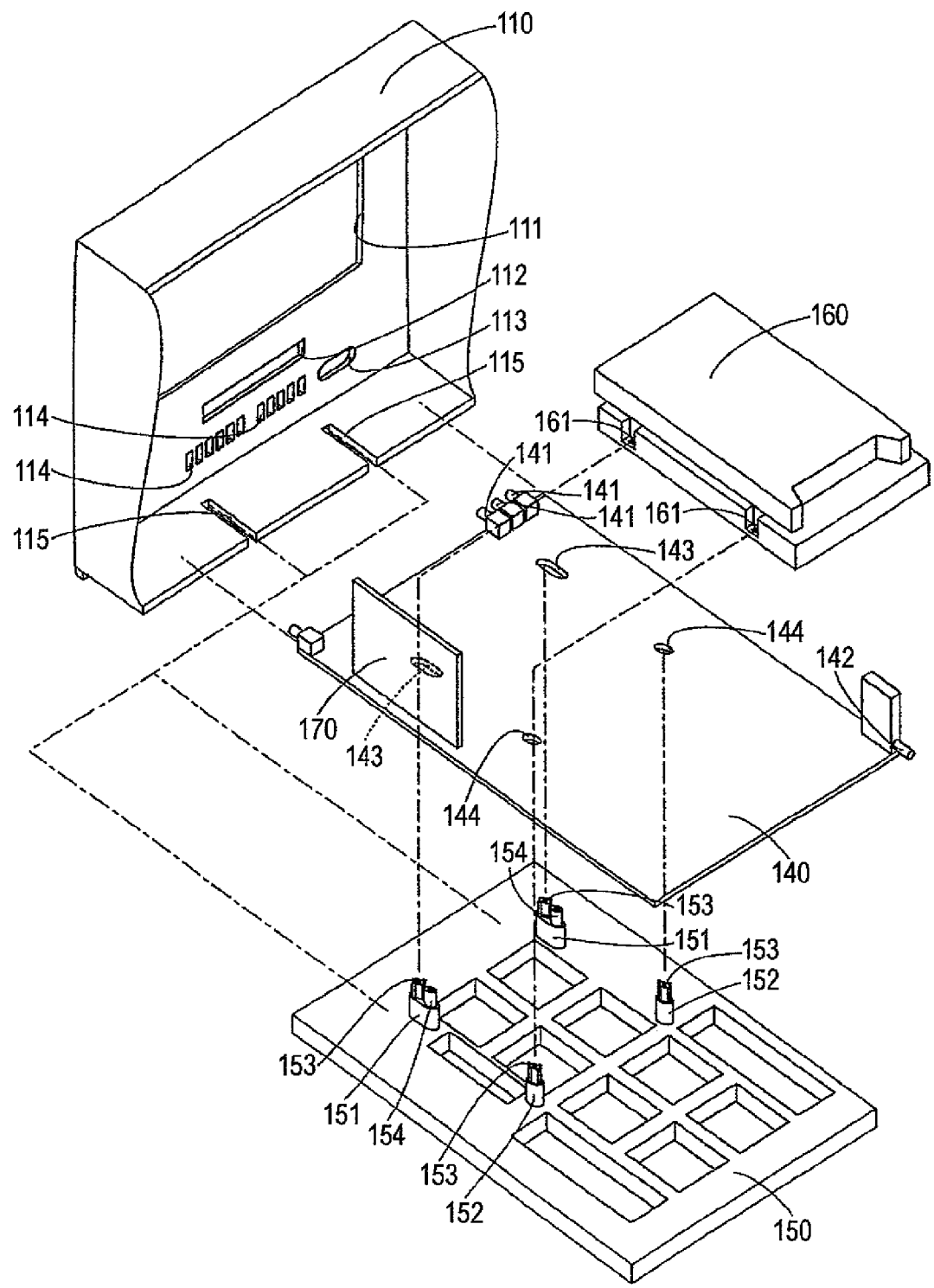
FIG. 12 is a disassembled perspective view of the DVD integrated type television of the related art shown in FIG. 11.
Figure 13:
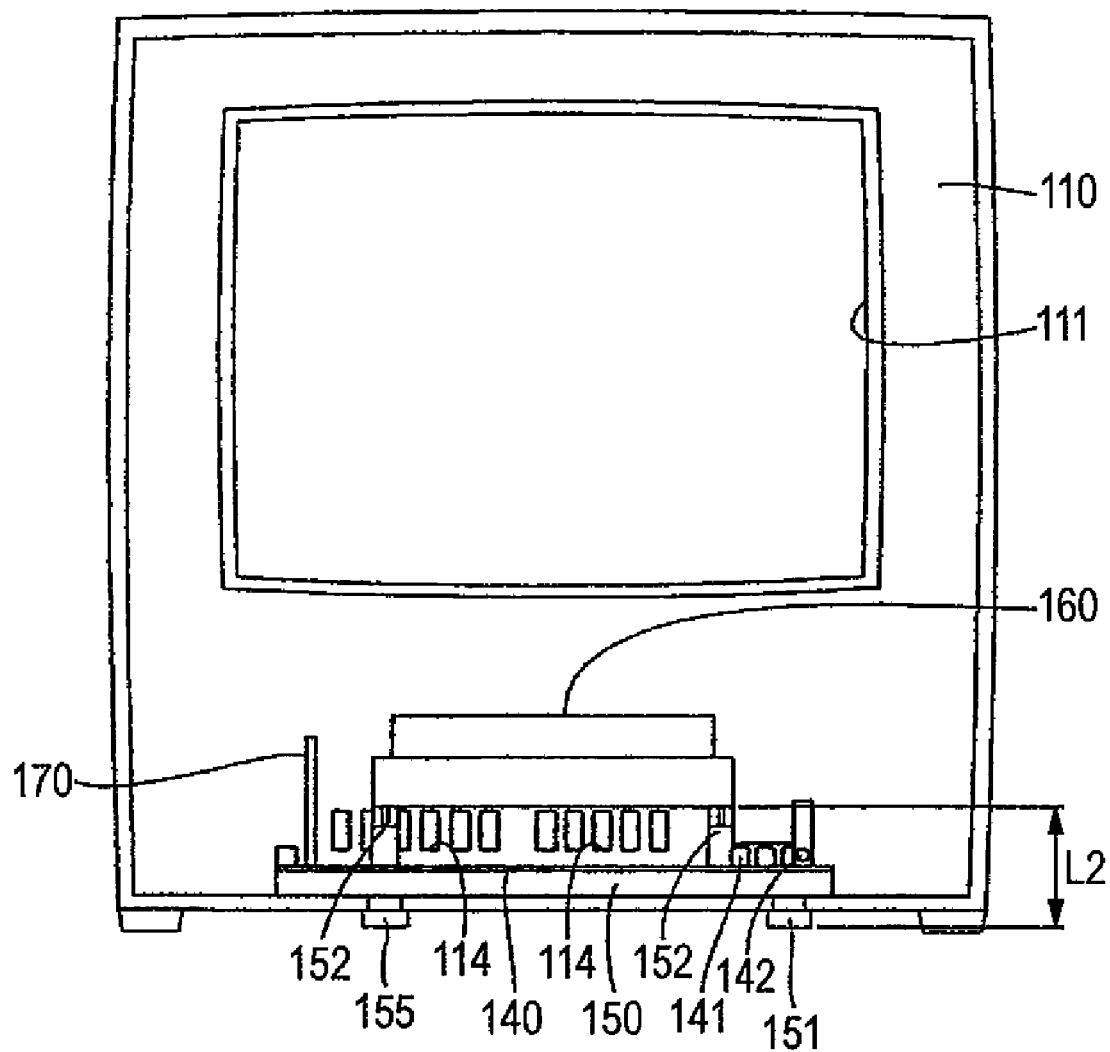
FIG. 13 is a front view of the DVD integrated type television of the related art shown in FIG. 11.
Figure 14:
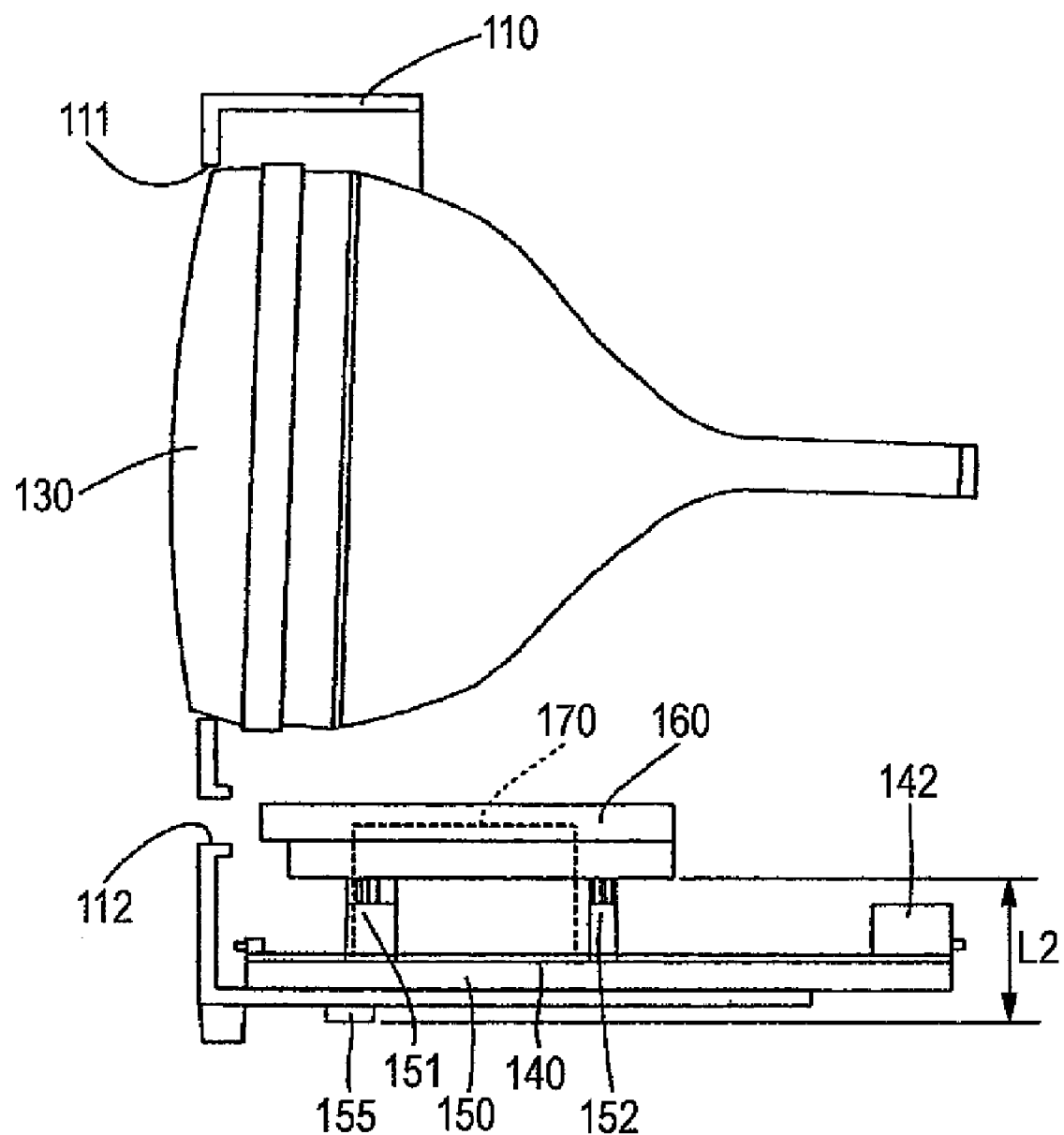
FIG. 14 is a side view of the DVD integrated type television of the related art shown in FIG. 11.
Figure 15:
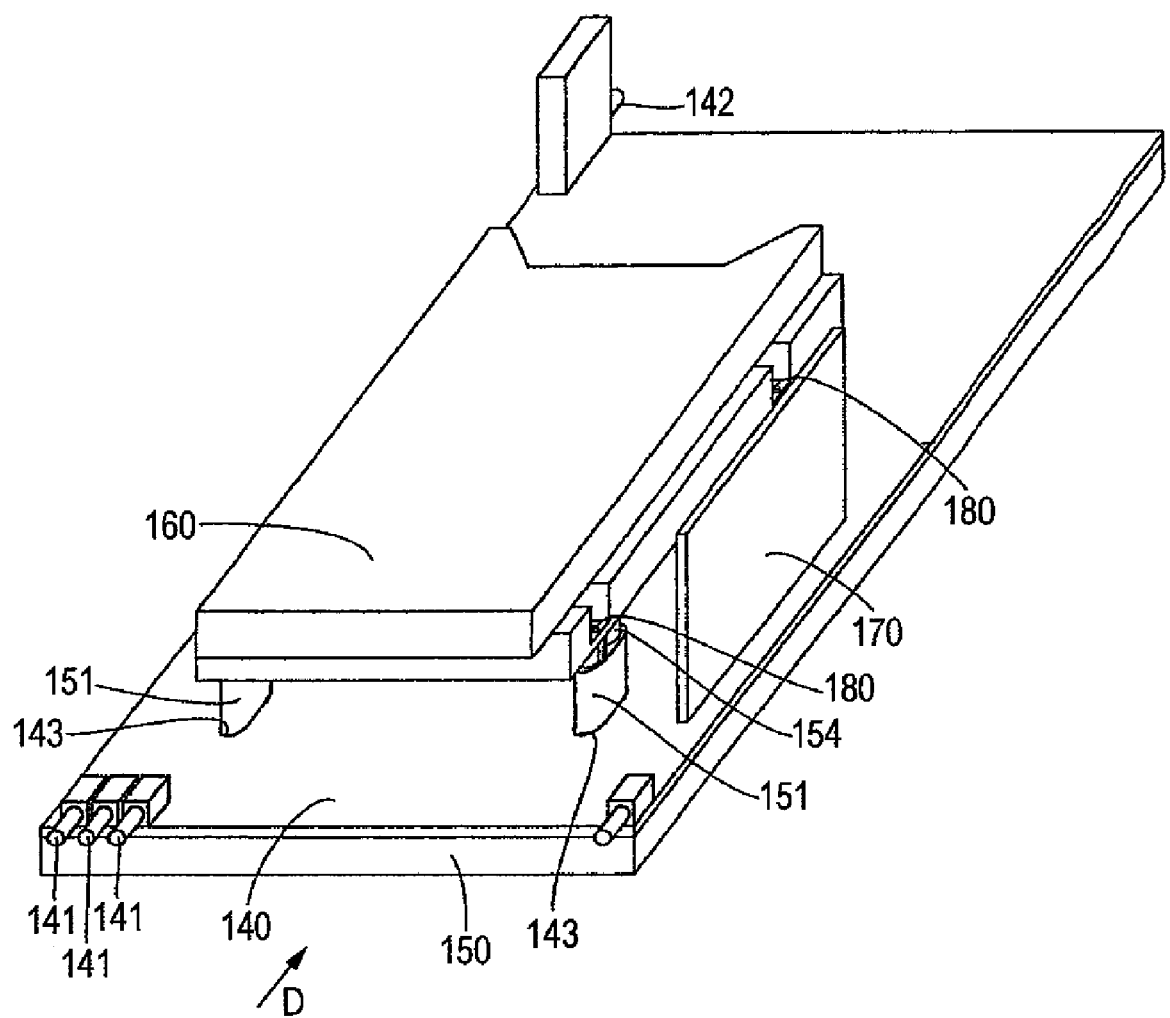
FIG. 15 is a perspective view of a printed circuit board, a holder and a DVD drive apparatus of the DVD integrated type television of the related art shown in FIG. 11.
Figure 16:
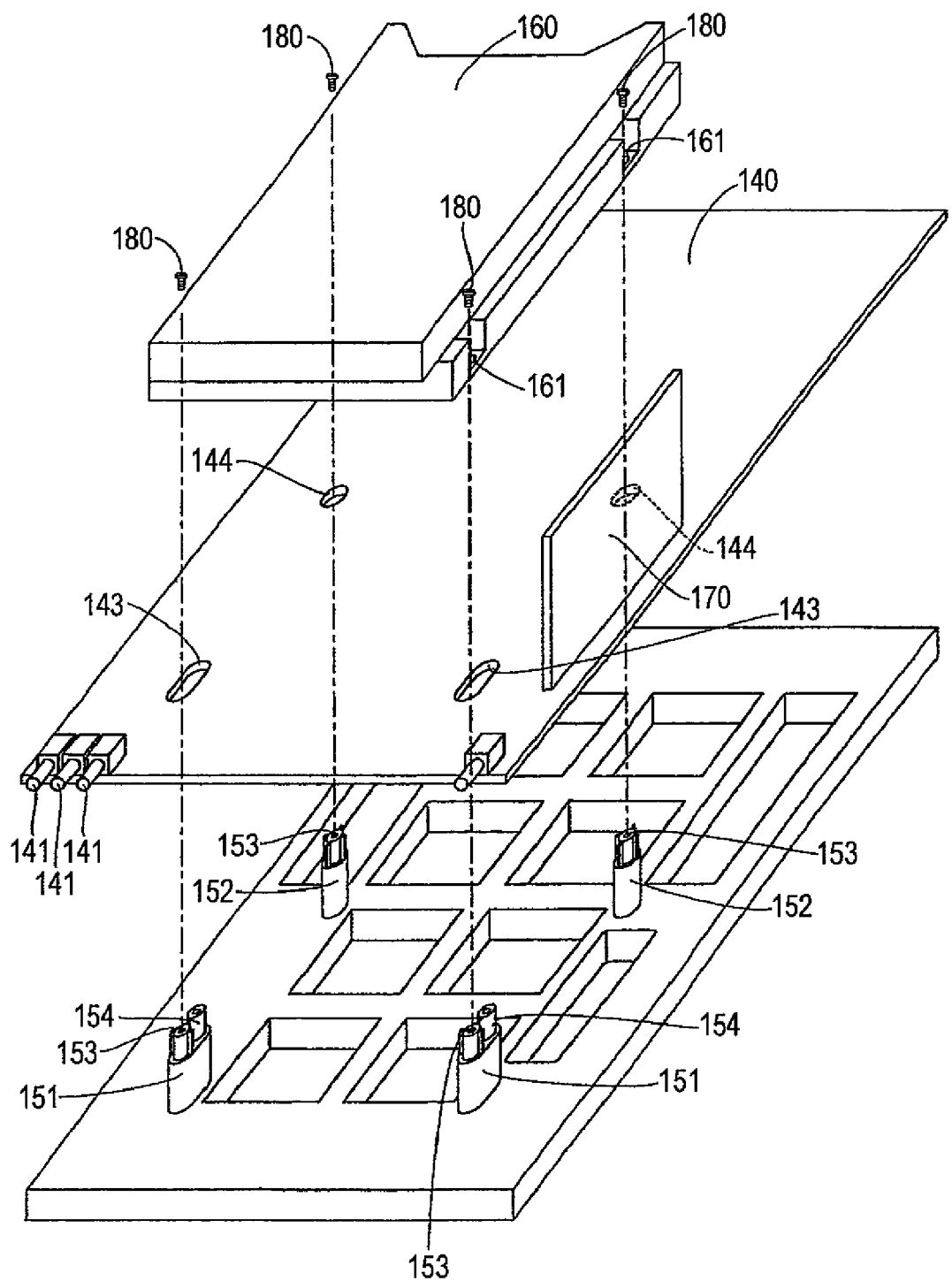
FIG. 16 is a disassembled perspective view of the printed circuit board, the holder and the DVD drive apparatus of the DVD integrated type television of the related art shown in FIG. 11.

According to the embodiment, as described above, by integrally providing the holder 50 with the rail engaging portion 55 engaged with the second rail portion 16 provided at the position of the predetermined height from the bottom face of the front cabinet 10, a lower face of the holder 50 supporting the DVD drive apparatus 60 can be attached at the position of the predetermined height from the bottom face of the front cabinet 10. Thereby, when the DVD drive apparatus 60 is supported by the stay portions 51 and 52 of the holder 50 at the predetermined position, in comparison with a case of attaching the lower face of the holder 50 supporting the DVD drive apparatus 60 at the bottom face of the front cabinet 10, the height (length) L1 from the lower face of the holder 50 to upper ends of the stay portions 51 and 52 can be reduced. Thereby, as shown by FIG. 9 and FIG. 10, when in a state of integrating the DVD drive apparatus 60 and the printed circuit board 40 to the holder 50 to be unitized, a plurality of stages of unitized sets thereof are overlapped to be contained in the packing box 90 to be carried, a number of pieces of containing the unitized sets of the packing box 90 can be increased by an amount of reducing the height L1 of the holder 50. As a result, in integrating the DVD drive apparatus 60 to the holder 50 to be unitized to carry, the carrying efficiency can be increased and the carrying cost can be reduced.

Further, according to the embodiment, by providing the single holder 50 provided with the stay portions 51 and 52 supporting the DVD drive apparatus 60, the DVD drive apparatus 60 can be supported only by the single holder 50 and therefore, a number of parts of members for supporting the DVD drive apparatus 60 can be prevented from being increased.

Further, according to the embodiment, by providing the first rail portion 15 of the front cabinet 10 supporting the printed circuit board 40 and the holder 50, the printed circuit board 40 can be supported by both of the first rail portion 15 of the front cabinet 10 and the holder 50. Therefore, in comparison with a case of supporting the printed circuit board 40 only by the holder 50, even when a plane area of the holder 50 is formed to be smaller than a plane area of the printed circuit board 40, the printed circuit board 40 can firmly be supported. As a result, small-sized formation of the holder 50 can be achieved. In this case, by providing the first rail portion 15 supporting the printed circuit board 40 integrally with the front cabinet 10, small-sized formation of the holder 50 can be achieved without increasing a number of parts.

Further, according to the embodiment, by forming the holder 50 to include the plane area smaller than the plane area of the printed circuit board 40, the plane area of the holder 50 can be reduced and therefore, small-sized formation of the holder 50 can easily be achieved.

Further, according to the embodiment, by providing the first rail portion 15 of the front cabinet 10 integrally with the front cabinet 10 and providing the second rail portion 16 of the front cabinet 10 integrally with the front cabinet 10, even when the holder 50 supporting the printed circuit board 40 and the DVD drive apparatus 60 are supported respectively by the first rail portion 15 and the second rail portion 16, the printed circuit board 40 and the holder 50 can be supported without increasing a number of parts. Further, by making the second height H2 of the second rail portion 16 supporting the holder 50 smaller than the first height H1 of the first rail portion 15 supporting the printed circuit board 40, easily, by the holder 50 supported by the second rail portion 16, the lower face of the printed circuit board 40 supported by the first rail portion 15 can be supported.

Further, the embodiment disclosed this time is an exemplification in all the respects and is to be regarded not to be restrictive. The range of the invention is indicated not by the above-described explanation of the embodiment but by the scope of claims and includes all of changes within the significance and the range of equivalency with the scope of claims.

For example, although according to the embodiment, the DVD integrated type television including the DVD drive apparatus is shown as an example of a television and an electronics device with a video reproducer including the included mechanical part, the invention is not limited thereto but is applicable also to other television and other electronics device with a video reproducer of, for example, a video integrated type television including a video deck as an included mechanical part so far as the apparatus are a television and an electronics device with a video reproducer having a holding member for supporting a printed circuit board.

What is claimed is:

1. A television with a video reproducer comprising:
a cabinet provided with a pair of first rail portions;
a printed circuit board attached to the pair of first rail portions of the cabinet;
an included mechanical part arranged on an upper side of the printed circuit board; and
a holding member provided with a stay portion for supporting the included mechanical part for supporting the printed circuit board, wherein:
the cabinet is provided with a pair of second rail portions for supporting the holding member;
the holding member is integrally provided with a rail engaging portion engaged with the second rail portion of the cabinet;
the first rail portion is integrally provided to the cabinet to be arranged at a position of a first height from a bottom face of the cabinet, and the second rail portion of the cabinet is integrally provided to the cabinet to be arranged at a position of a second height smaller than the first height from the bottom face of the cabinet; and
the holding member is provided with a plane area smaller than a plane area of the printed circuit board, and a total thereof is arranged at an inner portion of the cabinet without being exposed to outside of the cabinet.

2. An electronics device comprising:
a printed circuit board;
an included mechanical part arranged on an upper side of the printed circuit board;
a holding member provided with a stay portion for supporting the included mechanical part for supporting the printed circuit board; and
a cabinet integrally provided with a pair of first rail portions for supporting the printed circuit board, and a pair of second rail portions arranged at a position of a predetermined height from a bottom face thereof for supporting the holding member, wherein
the holding member is integrally provided with a rail engaging portion engaged with the second rail portion of the cabinet.

3. The electronics device according to claim 2, wherein a total of the holding member is arranged at an inner portion of the cabinet without being exposed to outside of the cabinet.

4. The electronics device according to claim 2, wherein the holding member is provided with a plane area smaller than a plane area of the printed circuit board.

5. The electronics device according to claim 2, wherein:
the first rail portion of the cabinet is integrally provided to the cabinet to be arranged at a position of a first height from a bottom face of the cabinet; and
the second rail portion of the cabinet is integrally provided to the cabinet to be arranged at a position of a second height smaller than the first height from the bottom face of the cabinet.

6. The electronics device according to claim 1, wherein the first rail portions directly support the printed circuit board.

7. The electronics device according to claim 1, wherein the second rail portions support only the holding member.

8. The electronics device according to claim 2, wherein the first rail portions directly support the printed circuit board.

9. The electronics device according to claim 2, wherein the second rail portions support only the holding member.

* * * * *